F. E. DENNIS.
AUXILIARY SHIELD FOR MOTOR VEHICLES.
APPLICATION FILED JULY 22, 1918.
1,322,412.
Patented Nov. 18, 1919.
3 SHEETS—SHEET 1.
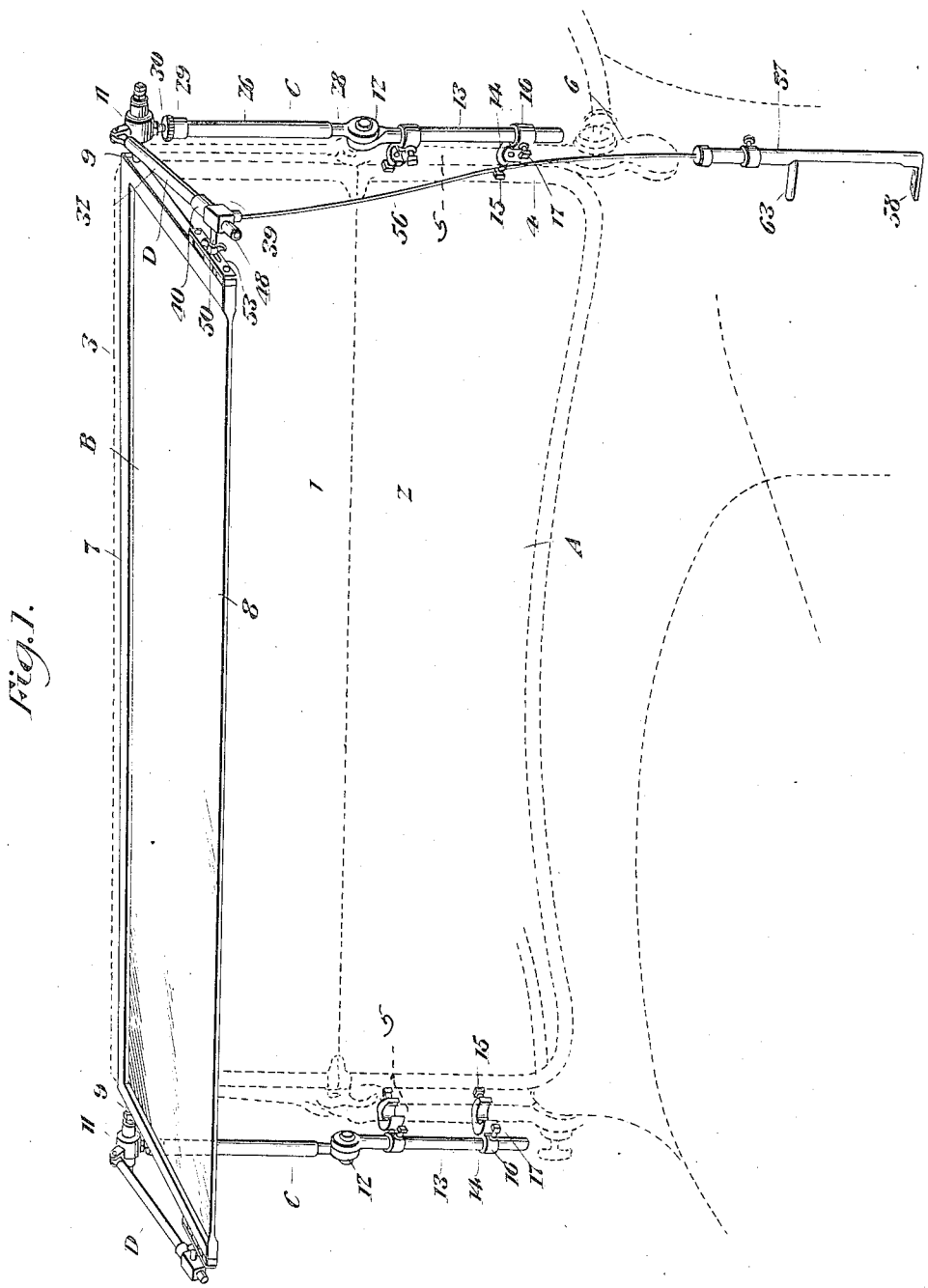

F. E. DENNIS.
AUXILIARY SHIELD FOR MOTOR VEHICLES.
APPLICATION FILED JULY 22, 1918.
1,322,412.
Patented Nov. 18, 1919.
3 SHEETS—SHEET 2.
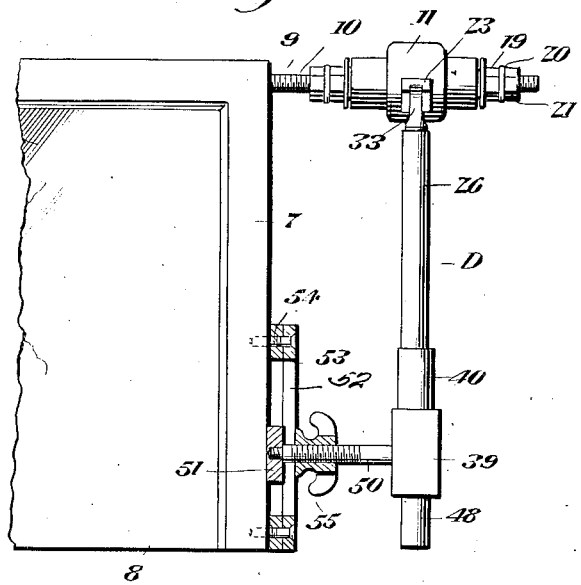
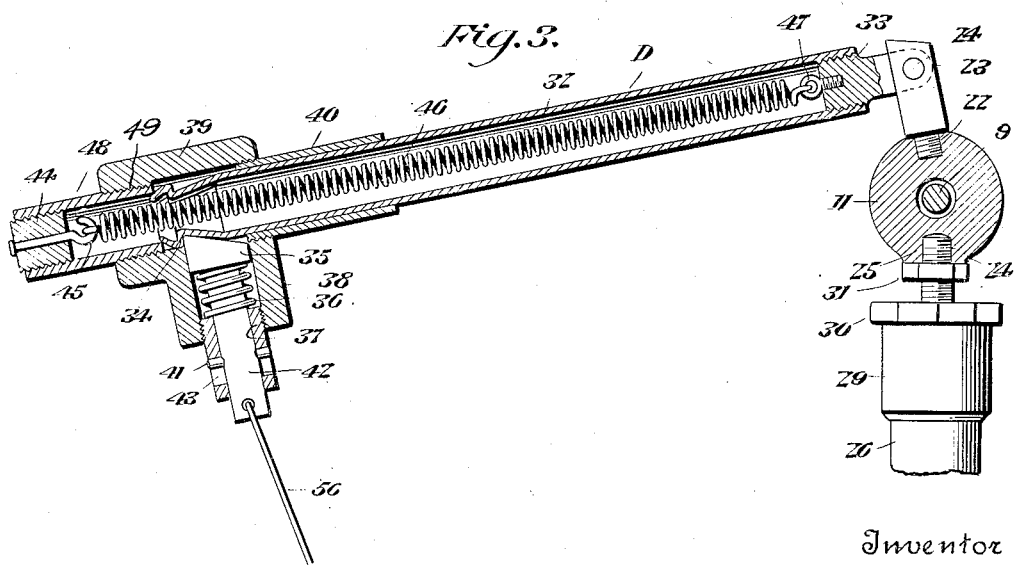
Witnesses
Inventor
F. E. Dennis
By Victor J. Evans
Attorney F. E. DENNIS.
AUXILIARY SHIELD FOR MOTOR VEHICLES.
APPLICATION FILED JULY 22, 1918.
1,322,412.
Patented Nov. 18, 1919.
3 SHEETS—SHEET 3.
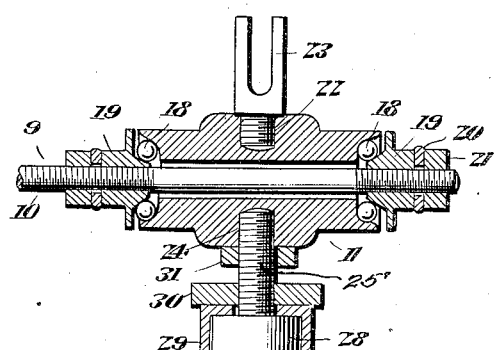
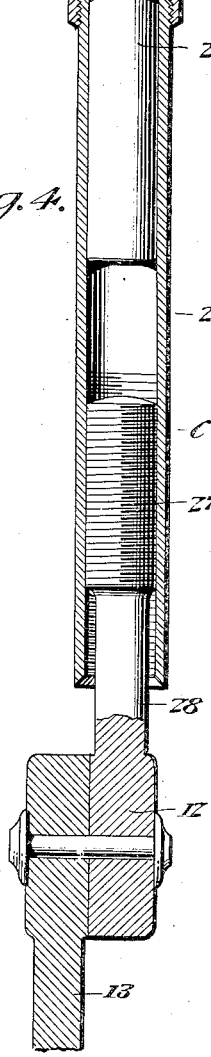
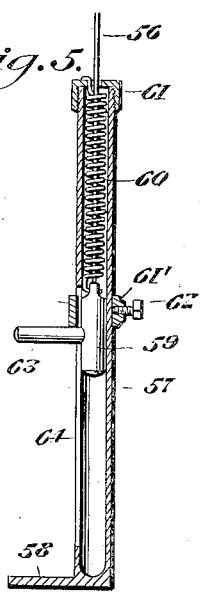
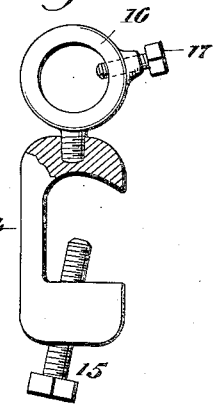
Witnesses
Inventor
F. E. Dennis
By Victor J. Evans
Attorney

UNITED STATES PATENT OFFICE.

FORESTI E. DENNIS, OF BLOOMDALE, OHIO.

AUXILIARY SHIELD FOR MOTOR-VEHICLES.

1,322,412.     Specification of Letters Patent.     Patented Nov. 18, 1919.

Application filed July 22, 1918. Serial No. 246,091.

*To all whom it may concern:*

Be it known that I, FORESTI E. DENNIS, a citizen of the United States, residing at Bloomdale, in the county of Wood and State of Ohio, have invented new and useful Improvements in Auxiliary Shields for Motor-Vehicles, of which the following is a specification.

This invention relates to auxiliary shields for motor vehicles, the object in view being to provide, for application to an ordinary wind shield, an auxiliary shield for protecting the driver and occupants of a motor vehicle in stormy weather and from the glaring rays of light from the head lamps of other motor vehicles when driving at night time.

The object of the invention is to produce an auxiliary shield of the character referred to which may be readily applied to the wind shield now universally in use on motor vehicles, the auxiliary shield being pivotally mounted in relation to the wind shield and having combined therewith operating means, a portion of which is automatical and another portion of which is manually controllable, whereby the auxiliary shield is adapted to automatically assume an out of the way position when released by the manually controllable means, and being also adapted to be moved to its useful position by the operator of the vehicle whenever required.

Another object of the invention is to provide means whereby the auxiliary shield may be fixedly clamped at any desired useful angle in relation to the wind shield.

Another object in view is to provide means whereby the auxiliary shield, as a whole, may be raised or lowered in order to more fully protect the occupants of the vehicle in stormy weather and also set forwardly or rearwardly in relation to the wind shield for the same purpose and also to adjust the auxiliary shield as a whole to any type of wind shield or motor vehicle in conjunction with which it is used.

With the above and other objects in view, the invention consists in the construction, combination and arrangement of parts, as herein described, illustrated and claimed.

In the accompanying drawings:

Figure 1 is a perspective view of a sufficient portion of a motor vehicle to illustrate the invention in its applied relation thereto.

Fig. 2 is an enlarged fragmentary vertical section showing the connection between the auxiliary shield mechanism and the wind shield.

Fig. 3 is an enlarged longitudinal section through one of the auxiliary shield operating arms.

Fig. 4 is an enlarged longitudinal section through one of the auxiliary shield supporting arms.

Fig. 5 is a longitudinal section through the pedal post, showing a portion of the operating connections for the auxiliary shield.

Fig. 6 is a detail view of one of the clamps for fastening the posts of the auxiliary shield to the wind shield.

Referring to the drawings, A designates generally an ordinary wind shield, such as is now used on motor vehicles, the same comprising an upper section 1 and a lower section 2, each of said sections embodying a marginal frame 3 and 4 and the usual white glass panels, the frame sections 3 and 4 being pivotally mounted between the usual wind shield standards 5 which are fixedly secured by attaching bases 6 to the cowl or dash of the motor vehicle.

In carrying out the present invention, I provide an auxiliary shield designated generally at B and comprising a three-sided frame 7 and a panel 8 of translucent material, preferably glass, having a suitable coloring, preferably a dark green, although any other desired glare-eliminating or refracting material may be used as may be found best suited for the purpose, which is to protect the eyes of the driver or other occupants of the motor vehicle from the glaring head lights of other motor vehicles.

The auxiliary shield B is pivotally mounted adjacent to the rear corners thereof by means of bearing studs 9 which project from the opposite ends of the auxiliary shield and are threaded as shown at 10. The studs 9 pass through bearing members 11 which are mounted upon the upper ends of longitudinally extensible supporting arms designated generally at C, the specific construction of which will be hereinafter described. The arms C are connected by pivots 12 of the friction joint type to a pair of upright posts 13, the latter being fastened to the opposite side uprights 5 of the wind shield frame by means of clamps 14 having binding screws 15 and also having projecting outwardly therefrom eyes 16 designed to receive the posts 13, said eyes being provided with binding screws 17 to engage the posts 13. By the means just described, the supporting posts 13 are secured in fixed relation to the uprights or standards 5 of the wind shield A.

Each of the bearing members 11 contains at the opposite ends thereof anti-friction bearing balls 18 in connection with which are used adjusting cones 19 which are threaded upon the adjacent bearing stud 9, washers 20 and nuts 21 being used in conjunction with said cones 19 to adjust the bearings of the member 11 and take up wear. Each bearing member 11 is formed with a threaded socket 22 to receive an upstanding fork 23 to which is connected by a pivot 24 one of a pair of auxiliary shield operating arms designated generally at D, the specific construction of which will hereinafter appear. Each bearing member 11 is also formed with a threaded socket 24 to receive the threaded upper extremity 25' of the upper inner telescopic member 25 of the longitudinally extensible arm C. The member 25 fits telescopically within a tubular member 26 of the arm C, the member 26 being internally threaded to receive the threaded end portion 27 of the lower section 28 of the arm C as shown in Fig. 4. Adjacent to its upper end, the member 25 is formed with an enlargement or collar 28 adapted to rest against the upper extremity of the tubular member 26 and to be held in fixed relation thereto by means of a cap nut 29 against which normally bears a lock nut 30. Another lock nut 31 engages the threaded portion 25 and bears tightly against the adjacent side of the bearing member 11. By loosening the nut 30, the cap nut 29 may be partially unscrewed and then the tubular member 26 may be turned upon its threaded connection with the lower member 28, thus providing for longitudinally extending the supporting arm C for the purpose of elevating or lowering the auxiliary shield. This enables the auxiliary shield to be adjusted to different wind shields according to the height of the wind shield and also the top or cover of the vehicle, insuring the exclusion of rain, snow, sleet, and the like. By means of the pivot joint at 12, the supporting arms C may be swung forwardly or rearwardly and this also enables the auxiliary shield to be adjusted into proper relation to the wind shield and the top or cover of the vehicle.

Each of the operating arms D is in the form of a tubular housing 32, the rear end thereof being internally threaded to receive a pivot stud 33 which is connected by the pivot 24 to the adjacent fork 23 of the respective bearing member 11. The pivotal connection of the arm D is thus located above the bearing stud 9, the purpose of which will presently appear. The forward extremity of each arm D is tapered and reduced to form an annular latch engaging shoulder 34 toward and away from which there is movable a spring pressed latch 35 urged toward the housing 32 by means of an expansion spring 36 which bears against a guide sleeve 37 threaded into a tubular lateral extension 38 of a slidable head 39 in relation to which the housing 32 is slidable, said head being formed with a guiding sleeve 40 which loosely surrounds the arm D, as shown in Fig. 3. A pin 41 extends through a transverse opening in the stem 42 of the latch 35 and also other slots or guideways 43 in opposite sides of the guide tube 37, allowing the latch to move into and out of engagement with the shoulder 34 of the housing 32. In the outer end of each arm D there is threaded a plug 44 which carries an eye 45 to which is attached one extremity of a contractile spring 46, the latter extending lengthwise through the housing 32 and having its opposite extremity connected to another eye 47, extending inwardly from the pivot stud 33 before referred to. It will be observed that the spring 46 opposes or resists the sliding movement of the respective arm D, and, therefore, acts to cause the uplift of the free end of said arm by reason of the construction and arrangement of certain of the parts about to be described. The tubular section or member 48, which carries the plug 44, is threaded into the head 39 as shown at 49 so as to abut against the adjacent end of the housing 32 and prevent rattling. The member 48 is adjustable in the head 39 for the purpose just referred to.

Projecting inwardly from each head 39 is a threaded stud 50 which carries at its inner end a runner or shoe 51 movable lengthwise of a guideway 52 formed by a guide strip 53 having its ends secured by fastening means 54 to the outer side of the auxiliary shield frame 7, as shown in Fig. 2. The stud 50 has a swiveled connection with the runner 51 and is also embraced by a clamping nut 55 of the thumb type, by tightening which, movement of the runner 51 into the guideway 52 may be prevented, when it is desirable to clamp the auxiliary shield in a fixed or rigid position as when traveling through a severe storm, in which case, it is not necessary to raise the auxiliary shield. When the nut 55 is loosened, the runner 51 may travel freely lengthwise of the guideway 52, under the influence of the contractile spring 45 in the adjacent tubular housing 32 which forms the main body of that operating arm of the auxiliary shield. The latch 35 connected with one of the arms 9 is operable from the adjacent side of the machine by means of a flexible connection, wire or cable 56, which extends into a substantially upright pedal post 57 having an attaching base 58 secured to the floor of the vehicle adjacent to the operator. The flexible connection 56 is attached at its lower extremity to a slide 59 mounted for longitudinal movement in the post 57 which is tubular as shown. The slide 59 is connected by a contractile spring 60 to a cap or sleeve 61 and the throw of said slide is limited by a stop collar 61' which is adjustable up and down on the post 57 and secured by means of a set screw 62. A pin or pedal member 63 extends horizontally from the slide 59 and is movable along a longitudinal slot 64 in one side of the post 57. It will now be observed that the operator, by depressing the member 63 draws on the connection 56, and moves the latch 35 out of engagement with the shoulder 34 of the adjacent arm D. This allows the forward edge of the auxiliary shield to be depressed but when said shield is returned to the position shown in Fig. 3, the latch 35, the member 63 being released, again engages the shoulder 34 and locks the parts in the position shown in Fig. 3. The degree of movement of the arm D may be varied by adjusting the collar 61' by means of the set screw 62 as the lower end of said member 61 serves as a stop for limiting the upward movement of the member 63 correspondingly limiting the upward movement of the arm D. The first action in releasing the member 63 is to release the latch 35 and then as the arm D moves upwardly by the action of the spring, the said latch engages the shoulder 34 and again locks the arm D in the position shown in Fig. 3. The arm D is moved downwardly by a pull on the connection 56 caused by depressing the part 63.

I do not desire to be limited to the details of the construction and arrangement hereinabove described and herein illustrated, it being apparent that various changes in the form, proportion and minor details of construction may be resorted to without departing from the principle or sacrificing any of the advantages of the invention.

I claim:—

1. The combination with a wind shield frame, of an auxiliary shield frame, supporting means for the latter embodying stationary posts at opposite sides of the wind shield frame, normally upstanding supporting arms for the auxiliary shield frame having a jointed connection with said posts, operating arms for said auxiliary shield pivotally connected at one end to said supporting arms and slidably attached at their other ends to said auxiliary shield frame, the latter being pivotally connected with said supporting arms below the point of attachment of said operating arms, and means for elevating and depressing the free ends of said operating arms.

2. The combination with a wind shield frame, of an auxiliary shield frame, supporting means for the latter embodying stationary posts at opposite sides of the wind shield frame, normally upstanding supporting arms for the auxiliary shield frame having a jointed connection with said posts, operating arms for said auxiliary shield pivotally connected at one end to said supporting arms and slidably attached at their other ends to said auxiliary shield frame, the latter being pivotally connected with said supporting arms below the point of attachment of said operating arms, means for elevating and depressing the free ends of said operating arms, the slidable attachment between the auxiliary shield and operating arms comprising runners attached to the latter, guiding means for said runners on the auxiliary shield, and yieldable means housed in said operating arms for actuating said runners.

3. The combination with a wind shield frame, of an auxiliary shield frame, supporting means for the latter embodying stationary posts at opposite sides of the wind shield frame, normally upstanding supporting arms for the auxiliary shield frame having a jointed connection with said posts, operating arms for said auxiliary shield pivotally connected at one end to said supporting arms and slidably attached at their other ends to said auxiliary shield frame, the latter being pivotally connected with said supporting arms below the point of attachment of said operating arms, means for elevating and depressing the free ends of said operating arms, the slidable attachment between the auxiliary shield and operating arms comprising runners attached to the latter, guiding means for said runners on the auxiliary shield, yieldable means housed in said operating arms for actuating said runners, and manually operable means for actuating said operating arms in opposition to said yieldable means.

4. The combination with a wind shield frame, of an auxiliary shield frame, supporting means for the latter embodying stationary posts at opposite sides of the wind shield frame, normally upstanding supporting arms for the auxiliary shield frame having a jointed connection with said posts, operating arms for said auxiliary shield pivotally connected at one end to said supporting arms and slidably attached at their other ends to said auxiliary shield frame, the latter being pivotally connected with said supporting arms below the point of attachment of said operating arms, means for elevating and depressing the free ends of said operating arms, the slidable attachment between the auxiliary shield and operating arms comprising runners attached to the latter, guiding means for said runners on the auxiliary shield, yieldable means housed in said operating arms for actuating said runners, and means for limiting the movement of said operating arms.

5. The combination with a wind shield frame, of an auxiliary shield frame, supporting means for the latter embodying stationary posts at opposite sides of the wind shield frame, normally upstanding supporting arms for the auxiliary shield frame having a jointed connection with said posts, operating arms for said auxiliary shield pivotally connected at one end to said supporting arms and slidably attached at their other ends to said auxiliary shield frame, the latter being pivotally connected with said supporting arms below the point of attachment of said operating arms, means for elevating and depressing the free ends of said operating arms, the slidable attachment between the auxiliary shield and operating arms comprising runners attached to the latter, guiding means for said runners on the auxiliary shield, yieldable means housed in said operating arms for actuating said runners, means for limiting the movement of said operating arms, and means for adjusting said limiting means.

6. The combination with a wind shield frame, of an auxiliary shield frame, supporting means for the latter embodying stationary posts at opposite sides of the wind shield frame, normally upstanding supporting arms for the auxiliary shield frame having a jointed connection with said posts, operating arms for said auxiliary shield pivotally connected at one end to said supporting arms and slidably attached at their other ends to said auxiliary shield frame, the latter being pivotally connected with said supporting arms below the point of attachment of said operating arms, means for elevating and depressing the free ends of said operating arms, the slidable attachment between the auxiliary shield and operating arms comprising runners attached to the latter, guiding means for said runners on the auxiliary shield, yieldable means housed in said operating arms for actuating said runners, and manually operable means for actuating said operating arms in opposition to said yieldable means, said operating arms being tubular, and the yieldable means being housed therein.

7. The combination with a wind shield frame, of an auxiliary shield frame, supporting means for the latter embodying stationary posts at opposite sides of the wind shield frame, normally upstanding supporting arms for the auxiliary shield frame having a jointed connection with said posts, operating arms for said auxiliary shield pivotally connected at one end to said supporting arms and slidably attached at their other ends to said auxiliary shield frame, the latter being pivotally connected with said supporting arms below the point of attachment of said operating arms, means for elevating and depressing the free ends of said operating arms, the slidable attachment between the auxiliary shield and operating arms comprising runners attached to the latter, guiding means for said runners on the auxiliary shield, yieldable means housed in said operating arms for actuating said runners, and means for fixedly clamping the runners to hold the auxiliary shield frame rigid.

8. The combination with a wind shield frame, of an auxiliary shield frame, supporting means for the latter embodying stationary posts at opposite sides of the wind shield frame, normally upstanding supporting arms for the auxiliary shield frame having a jointed connection with said posts, operating arms for said auxiliary shield pivotally connected at one end to said supporting arms and slidably attached at their other ends to said auxiliary shield frame, the latter being pivotally connected with said supporting arms below the point of attachment of said operating arms, and means for elevating and depressing the free ends of said operating arms, said posts being longitudinally extensible.

9. The combination with a wind shield frame, of an auxiliary shield frame, supporting means for the latter embodying stationary posts at opposite sides of the wind shield frame, normally upstanding supporting arms for the auxiliary shield frame having a jointed connection with said posts, operating arms for said auxiliary shield pivotally connected at one end to said supporting arms and slidably attached at their other ends to said auxiliary shield frame, the latter being pivotally connected with said supporting arms below the point of attachment of said operating arms, and means for elevating and depressing the free ends of said operating arms, said auxiliary shield comprising a translucent panel of glare-eliminating property.

In testimony whereof I affix my signature.

FORESTI E. DENNIS.